United States Patent [19]

Murata et al.

[11] Patent Number: 6,005,060
[45] Date of Patent: Dec. 21, 1999

[54] EPOXY RESIN COMPOSITION AND CURED COMPOSITE PRODUCT

[75] Inventors: Yasuyuki Murata, Yokkaichi; Mitsukazu Ochi, Suita; Norio Tohriiwa, Yokkaichi, all of Japan

[73] Assignee: Shell Oil Company, Houston, Tex.

[21] Appl. No.: 09/063,750

[22] Filed: Apr. 21, 1998

[30] Foreign Application Priority Data

Apr. 25, 1997 [JP] Japan .................................... 9-142881

[51] Int. Cl.⁶ .................................................. C08F 283/00
[52] U.S. Cl. .............................. 525/523; 524/588; 528/40
[58] Field of Search ............................... 528/40; 525/523; 524/588

[56] References Cited

U.S. PATENT DOCUMENTS

| | | | |
|---|---|---|---|
| 4,474,930 | 10/1984 | Mikami et al. | 525/523 |
| 5,700,581 | 12/1997 | Sachdev et al. | 528/40 |

FOREIGN PATENT DOCUMENTS

| | | |
|---|---|---|
| 280217/87 | 5/1986 | Japan . |
| 3012/88 | 6/1986 | Japan . |

*Primary Examiner*—Melvyn I. Marquis
*Attorney, Agent, or Firm*—Y. Grace Tsang

[57] ABSTRACT

The present invention provides an epoxy resin composition which can provide a cured composite product having a high heat resistance, and an excellent mechanical strength at a high temperature.

The present invention provides an epoxy resin composition comprising, as essential components: (a) an epoxy resin; (b) a curing agent for epoxy resins, (c) a silane compound having at least one epoxy group or a group being capable of reacting by addition to an epoxy group in a molecule, and at least two alkoxy groups connected to silicone atom in a molecule, and (d) a catalyst for condensation polymerization of a silane compound, and a cured composite product obtained by curing the composition.

14 Claims, No Drawings

EPOXY RESIN COMPOSITION AND CURED COMPOSITE PRODUCT

FIELD OF THE INVENTION

The present invention relates to a novel epoxy resin composition which can provide a cured product having a high heat resistance and an excellent mechanical strength at a high temperature, and a cured composite product obtained therefrom.

BACKGROUND OF THE INVENTION

In recent years, conditions in uses have become hard with an expansion in uses of polymeric materials, whereby, various properties required for the polymeric materials are becoming more severe. In some uses, since the polymeric materials are exposed to high temperatures and strength is lowered by softening, there is caused a problem of being incapable of using.

Epoxy resin compositions have been employed in a variety of fields such as laminating, coating, adhesion, encapsulating, molding, etc. However, because of the above-mentioned reasons, properties required have not become sufficiently satisfied in an epoxy resin composition in which a bisphenol A epoxy resin is employed which is usually employed at present.

In order to improve heat resistance, although there is tried the use of a multi-functional type epoxy resin such as a novolak type multifunctional epoxy resin, a three-functional epoxy resin and a four-functional epoxy resin, mechanical strength at high temperatures is not sufficient, and there is a drawback that a cured product obtained from the multi-functional type epoxy resin is hard, but brittle.

SUMMARY OF THE INVENTION

An object of the present invention is to provide a novel epoxy resin composition which can provide a cured composite product having a high heat resistance and an excellent mechanical strength at a high temperature, and a cured composite product obtained therefrom.

The present inventors, as a result of a variety of investigations for solving the above-mentioned problems, have attained the object of the present invention by preparing a composite with a silane compound having a specified structure.

That is, the present invention provides an epoxy resin composition comprising, as essential components:

(a) an epoxy resin;

(b) a curing agent for epoxy resins;

(c) a silane compound having at least one epoxy group or a group being capable of reacting by addition to an epoxy group in a molecule, and at least two alkoxy groups connected to silicon atom in a molecule; and (d) a catalyst for condensation polymerization of a silane compound.

DETAILED DESCRIPTION OF THE INVENTION

In a curing reaction for the epoxy resin composition of the present invention, the epoxy resin (a) reacts to the curing agent (b) for epoxy resins, and it changes to a cured product by crosslinking. Further, the silane compound (c) polymerizes through condensation by the catalyst (d) for condensation polymerization of a silane compound, and it changes to an inorganic silane polymer. In the case, the inorganic silane polymer disperses into the epoxy resin cured product with the size of an average particle diameter of 5 to 30 nm, and it becomes a cured composite product. The cured composite product has a large mechanical strength because molecular motion at high temperatures is suppressed.

The epoxy resin composition of the present invention is an epoxy resin composition which contains the epoxy resin (a), the curing agent (b) for epoxy resins, the silane compound (c), and the catalyst (d) for condensation polymerization of a silane compound as essential components. The epoxy resin (a) is not particularly limited, and a usual epoxy resin can be employed.

As the epoxy resin (a) to be employed, there are exemplified, for example, epoxy resins prepared by various phenols or phenol-based compounds and epihalohydrin, epoxy resins prepared by amines such as diaminodiphenyl methane, aminophenol, xylenediamine and epihalohydrin, and epoxy resins prepared by a variety of carboxylic acids such as methylhexahydroxy phthalic acid and a dimer acid and epihalohydrin, epoxy resins prepared by oxidation of unsaturated compounds, etc. The various phenols or phenol-based compounds include various phenols such as bisphenol A, bisphenol F, bisphenol AD, hydroquinone, methylhydroquinone, dimethylhydroquinone, dibutylhydroquinone, resorcin, methylresorcin, biphenol, tetramethylbiphenol, dihydroxy naphthalene, dihydroxydiphenylether, phenol novolak resin, cresol novolak resin, bisphenol A novolak resin, dicyclopentadienephenol resin, terpene phenol resin, phenolaralkyl resin, and naphthol novolak resin, multifunctional phenol resins obtained by condensation reaction of various phenols with aldehydes such as hydroxybenzaldehyde, croton aldehyde, glyoxal, etc.

Further, as a part of epoxy resins to be employed in order to give a flame retardancy to a cured product, a brominated epoxy resin can be employed. As the brominated epoxy resin, there are exemplified epoxy resins, for example, prepared from a brominated bisphenol A or brominated phenol novolak resin and epihalohydrin.

The curing agent (b) for epoxy resins to be formulated in the epoxy resin composition of the present invention is not particularly limited either, and a usual curing agent for epoxy resins can be employed.

As the curing agent, there are exemplified, for example, amines such as diethylenetriamine, triethylenetetramine, tetraethylene pentamine, isophoronediamine, dicyandiamide, diaminodiphenyl methane, and diaminodiphenyl sulfone, a variety of modified amines, a variety of polyamides, acid anhydrides such as methyltetrahydrophthalic anhydride, hexahydrophthalic anhydride, pyromellitic anhydride, and methylnadic anhydride, a variety of phenols such as phenol novolak resin, cresol novolak resin, bisphenol A novolak resin, dicyclopentadiene phenol resin, phenol aralkyl resin, terpene phenol resin, a variety of phenol resins such as multifunctional phenol resins obtained by a condensation reaction of various phenols with aldehydes such as hydroxybenzaldehyde, croton aldehyde, glyoxal, etc., polymerization catalysts for epoxide such as a $BF_3$ complex, sulfonium salts, and imidazoles.

The silane compound (c) to be formulated in the epoxy resin composition of the present invention is a compound having at least one epoxy group or a group being capable of reacting by addition to an epoxy group in a molecule, and at least two alkoxy groups connected to silicon atom in a molecule.

Although the inorganic silane polymer is dispersed into a cured product of the epoxy resin, since it has an epoxy group or a group being capable of reacting by addition to an epoxy group, it shows an effect of increasing mechanical strength at high temperatures by connecting also to the cured product of the epoxy resin at an interlayer.

As the group being capable of reacting by addition to an epoxy group, there are exemplified a primary or secondary amino group, a mercapto group, an isocyanate group, etc., and as the alkoxy group, there are exemplified methoxy group, ethoxy group, propoxy group, isopropenyloxy group, etc.

As the silane compound (c), there are exemplified compounds having structures as described below.

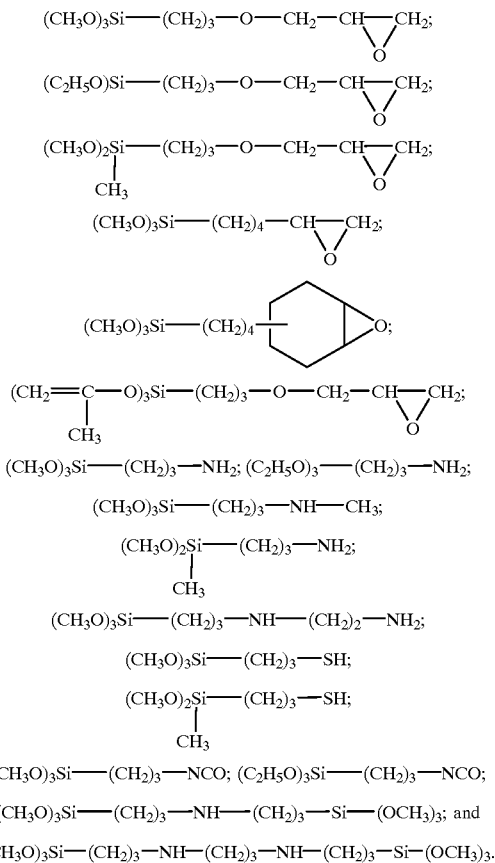

Of the various silane compounds (c), the compound represented by the general Formula (I) is preferred in view of physical properties and ease of obtaining.

Formula (I)

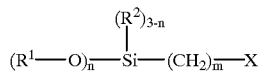

In Formula (I), each $R^1$ is identical or different, each denoting a saturated or unsaturated hydrocarbon group having a carbon number of 1 to 6, each $R^2$ is identical or different, each denoting a saturated or unsaturated hydrocarbon group having a carbon number of 1 to 6, X is selected from the group represented by Formula (II), Formula (III), Formula (IV), Formula V and Formula (VI) as described below, m is an integer of 1 to 6, and n is an integer of

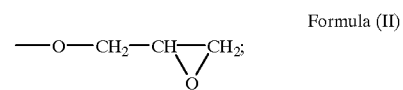

Formula (II)

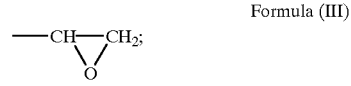

Formula (III)

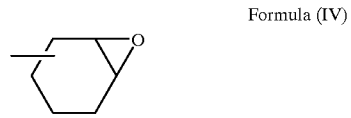

Formula (IV)

—NHR³          Formula (V)

wherein $R^3$ is a hydrogen atom, or a saturated or unsaturated hydrocarbon group having a carbon number of 1 to 6; and —SH          Formula (VI).

Mixing amount of the silane compound (c) is preferably 5 to 30% by weight, more preferably 10 to 25% by weight based on total amount of the epoxy resin (a), the curing agent (b) for an epoxy resin, and the silane compound (c). In the case of not more than 5% by weight and not less than 30% by weight, it is difficult to obtain a cured composite product which is desired, and an effect in the present invention is not sufficient.

The catalyst (d) for condensation polymerization of a silane compound to be formulated in the epoxy resin composition of the present invention is a catalyst by which an alkoxy group in the silane compound (c) is changed to an inorganic silane polymer through condensation polymerization, which is not particularly limited, and there can be employed all substances having the function.

As the catalyst for a condensation polymerization of a silane compound, there are exemplified, for example, inorganic acids such as hydrochloric acid, sulfuric acid, and nitric acid; organic acids such as a variety of sulfonic acids and sulfonic acid-type ion-exchange resins; titanic acid ester such as tetrabutyl titanate and tetrapropyl tinlaurate; tin carboxylic acids such as dibutyltin laurate, dibutyltin maleate, dibutyltin acetate, tin octylate, and tin naphtenate; organic aluminum compounds such as aluminum trisacetylacetonate, aluminum trisethylacetonate, and diisopropoxy aluminum ethylacetoacetate; chelate compounds such as zirconium tetraacetylacetonate and titanium tetraacetyl acetonate; lead octylate; amine-based compounds such as ammonia, butyl amine, octyl amine, dibutyl amine, monoethanol amine, diethanol amine, triethanol amine, diethylenetriamine, triethylenetetramine, oleyl amine, benzyl amine, benzyldimethyl amine, 2-ethyl-4-methylimidazole, 2,4,6-trisdimethylaminophenol, morpholine, DBU, and salts thereof with carboxylic acids.

Of the various catalysts (d) for condensation polymerization of a silane compound, the salts of an organic tin carboxylic acid are preferred in view of physical properties and ease of obtaining.

The catalyst (d) for condensation polymerization of a silane compound is preferably formulated in a mixing amount of 0.1 to 5% by weight, and more preferably 0.5 to 3% by weight based on the silane compound (c).

In the case of not more than 0.1% by weight, a reasonable inorganic silane polymer cannot be obtained and, in the case of not less than 5% by weight, adverse effect is dangerously caused by an excessive amount of catalysts.

In the condensation polymerization reaction of the silane compound (c), water is necessary other than the catalysts (d) for condensation polymerization of a silane compound. Although the reaction proceeds even by a small amount of water contained in respective components, 0.1 to 5% by weight of water is preferably added based on the silane compound (c).

In the epoxy resin composition of the present invention, there can be formulated various additives as well as in other usual epoxy resin compositions. As the various additives, there can be exemplified, for example, a curing accelerator, fillers, a coupling agent, a flame retardant, a plasticizer, a solvent, a reactive diluent, pigments, etc., and which can be optionally formulated in a reasonable amount.

As the curing accelerator, there are exemplified, for example, imidazoles such as 2-methylimidazole and 2-ethyl-4-methylimidazole, amines such as 2,4,6-tris (dimethylaminomethyl) phenol and benzylmethylamine, organic phosphorus compounds such as tributylphosphine, triphenylphosphine, tris (dimethoxyphenyl)phosphine, etc.

As the fillers, there are exemplified, for example, fused silica, crystalline silica, glass powder, alumina, calcium carbonate, etc. Further, as the flame retardant, there are exemplified, for example, antimony trioxide, phosphoric acid, etc., and further, flame retardancy can be attained by employing a brominated epoxy resin as a part of the epoxy resin to be employed.

The cured composite product of the present invention can be obtained by curing the epoxy resin composition of the present invention. Curing conditions thereof are largely different depending upon the kind of respective components to be employed, and curing is usually conducted at a temperature of 20 to 200° C. for 0.5 to 10 hours. Further, in the cured product, it is important that the inorganic silane polymer is dispersed with an average particle diameter of 5 to 30 nm in an epoxy resin cured product in view of obtaining aimed physical properties. It is also required that the curing conditions are controlled in order to obtain a reasonable dispersing state.

Since the epoxy resin composition of the present invention provides a cured composite product having a heat resistance, and an excellent mechanical strength at a high temperature, it can be advantageously employed in uses such as adhesion, casting, encapsulating, molding, laminating, coating, etc.

EXAMPLES

The epoxy resin composition and the cured composite product of the present invention are illustrated in more detail based on the following Examples which are included for illustrative purposes only and are in no way intended to limit the present invention.

Examples 1 to 4 and Comparative Examples 1 and 2

There were employed, as the epoxy resin (a), a bisphenol A type epoxy resin or a three-functional type epoxy resin, as the curing agent (b) for epoxy resins, tetraethylene pentamine or diaminodiphenyl methane, as the silane compound (c), 3-glycidyloxypropyl trimethoxysilane or 3-aminopropyl triethoxysilane, and as the catalysts (d) for condensation polymerization of a silane compound, dibutyltin laurate, in the amount as shown in Table 1, respectively.

Into a beaker, there were supplied 3-glycidyloxypropyl trimethoxysilane, dibutyltin laurate, and water, followed by being uniformly mixed. Subsequently, there were supplied the epoxy resin and the curing agent in the beaker to obtain a composition. The composition was cast into a mold in the thickness of 2 mm, followed by curing at 80° C. for 4 hours, and further, at 180° C. for 4 hours to obtain a cured product. The cured product was cut to obtain test pieces for measuring strength. Further, a dispersing state of inorganic silane polymer was measured by a transmittable type electronic microscope, followed by measuring particle diameter. Results are as shown in Table 1. Flexual strength of the test pieces is tested at a room temperature and a high temperature.

Respective molding materials in the Examples 1 to 4 provide cured products having more excellent strength at a high temperature compared to molding materials in the Comparative Examples 1 and 2, and the materials are suitable for materials to be employed at high temperatures.

TABLE 1

| Formulation (part by weight) | Example | | | | Comparative Example | |
|---|---|---|---|---|---|---|
| | 1 | 2 | 3 | 4 | 1 | 2 |
| (a) Epoxy resin | A | A | A | A | A | B |
| Mixed amount | 77.5 | 69.8 | 63.0 | 74.1 | 87.3 | 77.5 |
| (b) Curing agent for an epoxy resin | C | C | C | C | C | D |
| Mixed amount | 12.5 | 12.2 | 12.0 | 5.9 | 12.7 | 22.5 |
| (c) Silane compound | E | E | E | F | | |
| Mixed amount | 10.0 | 18.0 | 25.0 | 20.0 | — | — |
| (d) Catalyst for condensation polymerization *1 | 0.1 | 0.2 | 0.3 | 0.2 | — | — |
| Distilled water | 0.2 | 0.3 | 0.5 | 0.3 | — | — |
| Inorganic silane Polymer average particle diameter (nm) | 8 | 16 | 22 | 17 | — | — |
| Properties in a cured product flexual strength, 23° C. (kg/mm²) | 14.4 | 11.0 | 10.5 | 11.1 | 12.5 | 8.5 |
| Flexual strength, 230° C. (kg/mm²) | 2.6 | 3.0 | 3.1 | 2.9 | 0.2 | 0.7 |

A: a bisphenol A type epoxy resin (Epikote 828, an epoxy equivalent of 186, manufactured by Yuka Shell Epoxy K.K.)
B: a three-functional type epoxy resin (Epikote 1032, an epoxy equivalent of 170, manufactured by Yuka Shell Epoxy K.K.)
C: tetraethylene pentamine
D: diaminodiphenyl methane
E: 3-glycidoxypropyl trimethoxysilane
F: 3-aminopropyl triethoxysilane
*1: dibutyltin laurate Since the epoxy resin composition of the present invention provides a cured composite product having a high heat resistance, and an excellent mechanical strength at a high temperature, it is advantageous in uses such as adhesion, casting, encapsulating, molding, laminating, coating, etc., and an excellent effect is shown.

What is claimed is:

1. An epoxy resin composition comprising:
   (a) an epoxy resin;
   (b) a curing agent for epoxy resins;
   (c) a silane compound having at least one epoxy group or a group being capable of reacting by addition to an epoxy group in a molecule, and at least two alkoxy groups connected to silicon atom in a molecule; and (d) a catalyst for condensation polymerization of the silane compound of (c).

2. The epoxy resin composition of claim 1 wherein a mixing amount of the silane compound (c) is 5 to 30% by weight based on the total amount of said epoxy resin (a), said curing agent (b) for epoxy resins, and said silane compound (c).

3. The epoxy resin composition of claim 1, wherein a compound represented by Formula (I) described below is formulated as the silane compound (c):

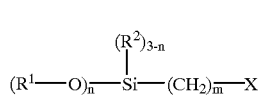

Formula (I)

wherein each $R^1$ is the same or different, each denoting a saturated or unsaturated hydrocarbon group having a carbon number of 1 to 6, each $R^2$ is the same or different, each denoting a saturated or unsaturated hydrocarbon group having a carbon number of 1 to 6, X is a group represented by Formula (II), Formula (III), Formula (IV), Formula (V) or Formula (VI) described below, m is an integer of 1 to 6, and n is an integer of 2 or 3:

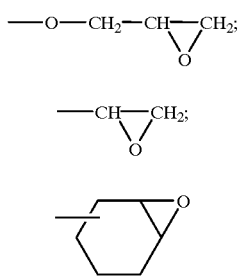

Formula (II)

Formula (III)

Formula (IV)

—NHR³   Formula (V)

wherein $R^3$ is a hydrogen atom, or a saturated or unsaturated hydrocarbon group having a carbon number of 1 to 6; and —SH   Formula (VI).

4. The epoxy resin composition of claim 2 wherein a compound represented by Formula (I) described below is formulated as the silane compound (c):

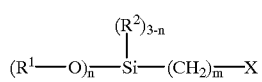

Formula (I)

wherein each $R^1$ is the same or different, each denoting a saturated or unsaturated hydrocarbon group having a carbon number of 1 to 6, each $R^2$ is the same or different, each denoting a saturated or unsaturated hydrocarbon group having a carbon number of 1 to 6, X is a group represented by Formula (II), Formula (III), Formula (IV), Formula (V) or Formula (VI) described below, m is an integer of 1 to 6, and n is an integer of 2 or 3,

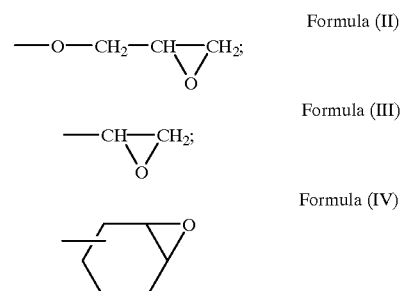

Formula (II)

Formula (III)

Formula (IV)

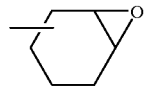   Formula (V)

wherein $R^3$ is a hydrogen atom, or a saturated or unsaturated hydrocarbon group having a carbon number of 1 to 6; and —SH   Formula (VI).

5. The epoxy resin composition of claim 1 wherein a salt of an organic tin carboxylic acid is formulated in an amount of 0.1 to 5% by weight based on the silane compound (c) as the catalyst (d) for condensation polymerization of a silane compound.

6. The epoxy resin composition of claim 3 wherein a salt of an organic tin carboxylic acid is formulated in an amount of 0.1 to 5% by weight based on the silane compound (c) as the catalyst (d) for condensation polymerization of a silane compound.

7. The epoxy resin composition of claim 4 wherein a salt of an organic tin carboxylic acid is formulated in an amount of 0.1 to 5% by weight based on the silane compound (c) as the catalyst (d) for condensation polymerization of a silane compound.

8. The epoxy resin composition of claim 1 wherein water is formulated in an amount of 0.1 to 5% by weight based on the silane compound (c) in addition to the above-mentioned components (a) to (d).

9. The epoxy resin composition of claim 3 wherein water is formulated in an amount of 0.1 to 5% by weight based on the silane compound (c) in addition to the above-mentioned components (a) to (d).

10. The epoxy resin composition of claim 4 wherein water is formulated in an amount of 0.1 to 5% by weight based on the silane compound (c) in addition to the above-mentioned components (a) to (d).

11. A cured composite product characterized in that an inorganic silane polymer is dispersed with an average particle diameter of 5 to 30 nm in an epoxy resin cured product obtained by curing an epoxy resin composition as described in claim 1.

12. A cured composite product characterized in that an inorganic silane polymer is dispersed with an average particle diameter of 5 to 30 nm in an epoxy resin cured product obtained by curing an epoxy resin composition as described in claim 2.

13. A cured composite product characterized in that an inorganic silane polymer is dispersed with an average particle diameter of 5 to 30 nm in an epoxy resin cured product obtained by curing an epoxy resin composition as described in claim 3.

14. A cured composite product characterized in that an inorganic silane polymer is dispersed with an average particle diameter of 5 to 30 nm in an epoxy resin cured product obtained by curing an epoxy resin composition as described in claim 4.

* * * * *